US011886172B2

(12) United States Patent
Poisson et al.

(10) Patent No.: US 11,886,172 B2
(45) Date of Patent: Jan. 30, 2024

(54) OPERATING A FACTORY

(71) Applicant: DASSAULT SYSTEMES, Velizy-Villacoublay (FR)

(72) Inventors: Laure-Anne Poisson, Sceaux (FR); Philippe Belmans, Velizy-Villacoublay (FR); Ana Marcusanu, Velizy-Villacoublay (FR); Vincent Siess, Velizy-Villacoublay (FR)

(73) Assignee: DASSAULT SYSTEMES, Velizy-Villacoublay (FR)

( * ) Notice: Subject to any disclaimer, the term of this patent is extended or adjusted under 35 U.S.C. 154(b) by 110 days.

(21) Appl. No.: 17/645,043

(22) Filed: Dec. 17, 2021

(65) Prior Publication Data
US 2022/0197259 A1 Jun. 23, 2022

(30) Foreign Application Priority Data
Dec. 18, 2020 (EP) .................................... 20306624

(51) Int. Cl.
*G05B 19/418* (2006.01)
(52) U.S. Cl.
CPC .................. *G05B 19/41865* (2013.01); *G05B 2219/32423* (2013.01)
(58) Field of Classification Search
None
See application file for complete search history.

(56) References Cited

U.S. PATENT DOCUMENTS

| | | | | |
|---|---|---|---|---|
| 6,023,702 A | * | 2/2000 | Leisten | G06Q 10/06 707/999.102 |
| 6,141,776 A | * | 10/2000 | Grose | G06Q 10/06 714/39 |

(Continued)

FOREIGN PATENT DOCUMENTS

EP 3 477 560 A1 5/2019

OTHER PUBLICATIONS

Chua et al., "A Heuristics-based Advanced Planning and Scheduling System with Bottleneck Scheduling Algorithm", 2006, IEEE, pp. 240-247 (Year: 2006).*
Yarnada—"Dynamic Reconfiguration of Reconfigurable Manufacturing Systems Using Particle Swarm Optimization", Proceedings of the 2006 IEEE International Conference on Robotics and Automation, Orlando, Florida, May 2006 (6 pages).

(Continued)

*Primary Examiner* — Jason Lin
(74) *Attorney, Agent, or Firm* — Oblon, McClelland, Maier & Neustadt, L.L.P.

(57) ABSTRACT

It is proposed a method for factory operation. The method includes providing manufacturing tasks each represented by a law describing a manufacturing of a product by one or more manageable machines. The method includes obtaining one or more manufacturing constraints and one or more manufacturing events. The method includes determining an operating mode of the factory based on the one or more manufacturing constraints and on one or more product constraints. The determining includes one or more iterations. Each iteration computes a respective propensity of each manufacturing task representing a frequency with which the task is chosen for manufacturing the product given the constraints and/or a previous event(s) occurrence. The iteration ranks the tasks according to a propensity descending order. The iteration visits the tasks according to the ranking (Continued)

and affecting to each task one or more manageable machines and resources. The iteration executes the tasks until an event(s).

20 Claims, 4 Drawing Sheets

(56) References Cited

U.S. PATENT DOCUMENTS

| | | | | |
|---|---|---|---|---|
| 6,473,794 | B1* | 10/2002 | Guheen | H04L 43/50 |
| | | | | 709/224 |
| 9,076,116 | B2* | 7/2015 | Furbeck | G06Q 10/06316 |
| 11,150,629 | B2* | 10/2021 | Beard | G06Q 10/0635 |
| 2002/0133264 | A1* | 9/2002 | Maiteh | G05B 19/4097 |
| | | | | 700/86 |
| 2006/0129970 | A1* | 6/2006 | Haas | G06Q 10/00 |
| | | | | 717/135 |
| 2008/0154412 | A1* | 6/2008 | Steinbach | G06Q 10/06 |
| | | | | 700/97 |
| 2008/0154660 | A1* | 6/2008 | Steinbach | G06Q 10/06 |
| | | | | 705/7.11 |
| 2009/0069920 | A1* | 3/2009 | Franzen | G06Q 10/06 |
| | | | | 700/97 |
| 2012/0050287 | A1* | 3/2012 | Grose | G06Q 10/06 |
| | | | | 345/420 |
| 2014/0222492 | A1* | 8/2014 | Furbeck | G06Q 10/06316 |
| | | | | 705/7.26 |
| 2015/0045928 | A1* | 2/2015 | Perez | B29C 48/266 |
| | | | | 700/110 |
| 2015/0148922 | A1* | 5/2015 | Yen | G05B 19/406 |
| | | | | 700/79 |

OTHER PUBLICATIONS

Touzout et al.—"Multi-objective multi-unit process plan generation in a reconfigurable manufacturing environment: a comparative study of three hybrid metaheuristics", International Journal of Production Research, 2019 (17 pages).
Tang et al.—"Adaptive Control of Bio-Inspired Manufacturing Systems", Research on Intelligent Manufacturing (2020) (134 pages).
Reaidy et al.—"Comparison of negotiation protocols in dynamic agent-based manufacturing systems", Int. J. Production Economics 99 (2006), (14 pages).
Park et al.—"An autonomous manufacturing system based on swarm of cognitive agents", Journal of Manufacturing Systems 31 (2012), (12 pages).
Gillespie "A General Method for Numerically Simulating the Stochastic Time Evolution of Coupled Chemical Reactions", Journal of Computational Physics 22, 1976, (32 pages).
Benaissa et al.—"Control of chaos in agent based manufacturing systems", 2008, IEEE, (8 pages).
Search Report dated Jun. 14, 2021 issued in corresponding European patent application No. 20306624.6 (8 pages).

* cited by examiner

OPERATING A FACTORY

CROSS-REFERENCE TO RELATED APPLICATION

This application claims priority under 35 U.S.C. § 119 to European Patent Application No. 20306624.6, filed Dec. 18, 2020. The entire contents of the above application are incorporated herein by reference.

FIELD

The disclosure relates to the field of computer programs and systems, and more specifically to a method, system and program for operating a factory.

BACKGROUND

A number of systems and programs are offered on the market for the design, the engineering and the manufacturing of objects. CAD is an acronym for Computer-Aided Design, e.g., it relates to software solutions for designing an object. CAE is an acronym for Computer-Aided Engineering, e.g., it relates to software solutions for simulating the physical behavior of a future product. CAM is an acronym for Computer-Aided Manufacturing, e.g., it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by Dassault Systèmes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, resources to enable dynamic, knowledge-based product creation and decision support that drives optimized product definition, manufacturing preparation, production and service.

In this context and other contexts, determining operating modes of a factory faces an increased interest. Among objectives in determining operating modes of a factory, one is to automatically operate an automated factory by providing a computer system which operates the factory with a set of instructions and settings to automatically cause the factory to execute one or more manufacturing processes to produce an object (e.g., a mechanical part). Among other objectives for determining operating modes of a factory (sometimes referred to as "manufacturing scheduling"), one objective is to plan at what time specific production tasks must be performed, on which machine in the factory, by which operators, and/or with which supplies, while optimizing given outcomes such as the production duration, the energy consumption, product quality (e.g., manufacturing tasks must be carried out in a certain order within a certain time, for example demolding tasks must happen after molding tasks), or security (e.g., by ensuring that there is always enough workers/employees that watch the factory).

In the industrial context, existing methods for scheduling manufacturing processes for operating a plant use a two steps optimization approach. In a first step, an optimization algorithm finds an optimal scheduling for the machines. In a second step, given the schedule of the machines, an optimization algorithm finds an optimal schedule for the workers. In real industrial situations, such schedules are theoretical or idealistic as unexpected problems always occur (machine failures, sick workers, new urgent command to satisfy, security problems/emergencies). If such perturbations occur, it is up to the workers to find a solution by themselves (for example, by responding to security emergencies by themselves), or, if time is sufficient, a new solution can be computed by the algorithms, that will try to minimize the difference with the previous solution. Existing methods thus lack robustness and adaptability to occurrences of manufacturing events.

In the academic field, many approaches have been imagined. They often are inspired by game theory. Game theory inspired solutions consider machines and operators as entities that have individual goals and will negotiate with one another to decide who will be given the right to perform a task.

However, there is still a need for an improved method for operating a factory.

SUMMARY

It is therefore provided a computer-implemented method for operating a factory. The method comprises providing one or more manufacturing tasks. Each manufacturing task is represented by an evolution law. The evolution law describes a manufacturing step of a product by one or more manageable machines using resources. The method further comprises providing one or more manufacturing constraints. The method further comprises providing one or more manufacturing events. The method further comprises determining an operating mode of the factory based on the one or more manufacturing constraints and on one or more constraints on a product to manufacture. The determining includes one or more iterations. Each iteration comprises computing, for each manufacturing task, a respective propensity of the manufacturing task. The propensity represents a frequency with which the task is chosen for manufacturing the product given the constraints and/or a previous occurrence of one or more of the manufacturing events. The iteration further comprises ranking the one or more manufacturing tasks according to a descending order of their respective propensities. The iteration further comprises visiting the one or more manufacturing tasks according to the ranking and, for each visited task, affecting to the task one or more manageable machines and resources for executing the task. The iteration may further comprise executing the one or more tasks until an occurrence of one or more of the manufacturing events.

The method may comprise one or more of the following features:
  for each manufacturing task, the propensity is an increasing function of each of:
    a number of the one or more manageable machines,
    a quantity of a state of the product before the manufacturing step,
    an indicator that a quantity of the resources is above a threshold of resources required for executing the manufacturing step;

for one or more manufacturing tasks, the function is also an increasing function of a number of operators of the one or more manageable machines;
for one or more manufacturing tasks, the function is also an increasing function of a term rewarding respect of at least one of the constraints;
for one or more manufacturing tasks, the function is also an increasing function of a parameter for fostering a slow and/or economical operation of the factory;
the function is a product of its variables;
the ranking comprises attributing to each manufacturing task a rank given by an exponential law of parameter equal to the propensity;
the exponential law further depends on a randomly generated number;
the determining further comprises, at each iteration, after the executing:
updating data about the product to manufacture;
the providing comprises, for each manufacturing task, defining the evolution law by representing the manufacturing task by a chemical reaction, wherein the chemical reaction is of the type:

$$M+R+S_n => IS$$

$$IS => M+S_{n+1},$$

where M represents the one or more manageable machines, R represents the resources, $S_n$ represents a state of the product before execution of the manufacturing task, IS represents the product while being transformed by the manufacturing task, and $S_{n+1}$ represents a state of the product after execution of the manufacturing task, and wherein the respective propensity of the manufacturing task is given by the formula:

$$P=[M][S_n]\{[R] \geq c\}[RP],$$

where P is the propensity, [M] is a number of the one or more manageable machines, $[S_n]$ is a quantity of the state product before the manufacturing step, $\{[R] \geq c\}$ is an indicator that a quantity of the resources is above a threshold of resources required for executing the manufacturing step, c being the threshold, and [RP] is a term rewarding respect of at least one of the constraints; and/or
the method further comprises, based on the determined operating mode, assigning manageable machines and resources to respective manufacturing tasks, and after the assigning, operating the factory.

It is further provided a computer program comprising instructions for performing the method.

It is further provided a device comprising a data storage medium having recorded thereon the computer program.

The device may form or serve as a non-transitory computer-readable medium, for example on a SaaS (Software as a service) or other server, or a cloud based platform, or the like. The device may alternatively comprise a processor coupled to the data storage medium. The device may thus form a computer system in whole or in part (e.g., the device is a subsystem of the overall system). The system may further comprise a graphical user interface coupled to the processor.

It is further provided a factory comprising at least one manageable machine operable by an operating mode of the factory determined according to the method.

BRIEF DESCRIPTION OF THE DRAWINGS

Embodiments will now be described, by way of non-limiting example, and in reference to the accompanying drawings, where.

DETAILED DESCRIPTION

Figure 1:
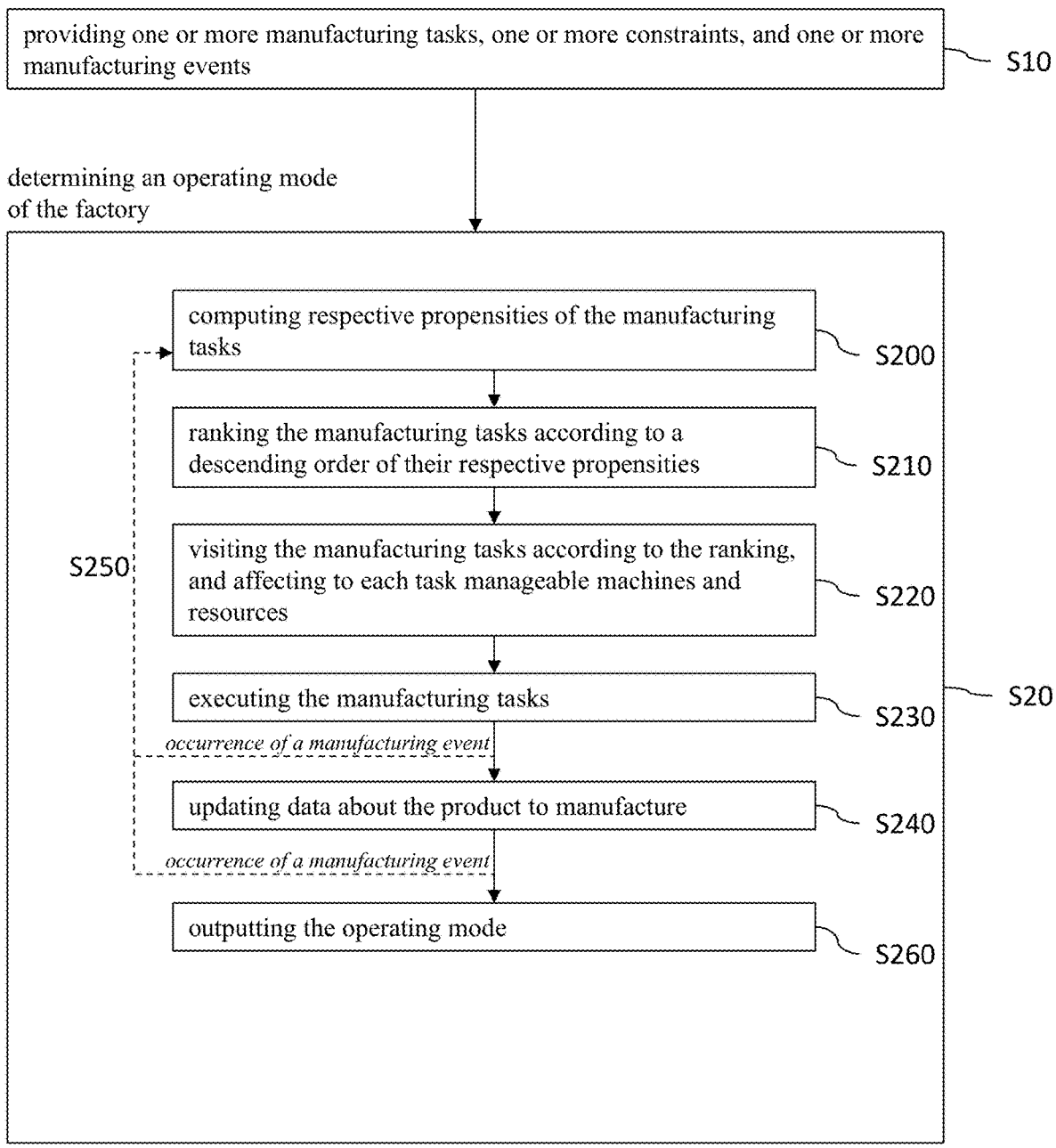
FIG. 1 shows a flowchart of an example of the method.

With reference to the flowchart of FIG. 1, it is proposed a computer-implemented method for operating a factory. The method comprises providing S10 one or more manufacturing tasks. Each manufacturing task is represented by an evolution law. The evolution law describes a manufacturing step of a product by one or more manageable machines using resources. The method further comprises providing one or more manufacturing constraints. The method further comprises providing one or more manufacturing events. The method further comprises determining S20 an operating mode of the factory based on the one or more manufacturing constraints and on one or more constraints on a product to manufacture. The determining S20 includes one or more iterations S250. Each iteration comprises computing S210, for each manufacturing task, a respective propensity of the manufacturing task. The propensity represents a frequency with which the task is chosen for manufacturing the product given the constraints and/or a previous occurrence of one or more of the manufacturing events. The iteration further comprises ranking S220 the one or more manufacturing tasks according to a descending order of their respective propensities. The iteration further comprises visiting S230 the one or more manufacturing tasks according to the ranking and, for each visited task, affecting to the task one or more manageable machines and resources for executing the task. The iteration further comprises executing S240 the one or more tasks until an occurrence of one or more of the manufacturing events.

This constitutes an improved method for operating a factory.

Notably, the method allows to operate a factory by determining an operating mode of the factory. The operating mode refers to a set of instructions and settings to be executed for the factory to function given the constraints and occurrences of events, i.e., to execute the proper manufacturing tasks in the proper order to manufacture the product given the constraints and occurrences of events. The determined operating mode may notable be used to automatically operate an automated factory. The determined operating mode may be outputted by the method as a computer-implemented data structure (e.g., a file). Then the determined operating mode may be fed to a computer system operating the automated factory. The computer system may then read the operating mode and implement its instructions, thereby causing the automated factory to function according to the operating mode. In other words, the operating mode may directly be implemented by the automated factory.

Alternatively, each run of the method performed on a computer can correspond to an instance of a manufacturing schedule, each run yielding a determined operating mode that can then be given to real life workers. If many runs are performed (which is possible as the method runs fast), the best according to specific criteria can be chosen.

As said above, the method runs fast, i.e., the method determines an operating mode very quickly, for example in a few seconds or in a few minutes, each iteration within the determining of the operating mode being carried out very fast. This provides a significant improvement over previously-discussed prior art optimization methods as it allows a real-time adaptation of the operation of the factory to real-time occurring events.

Whether the factory is automated or not, the operating mode may comprise or consist in a schedule for the execution of the one or more manufacturing task, with instructions for execution of each task, and/or assignments of resources and/or operators (e.g., workers or computer systems operating machines) and/or machines to given manufacturing tasks. In other words, the schedule may describe which tasks must be performed by which machine(s) and which operator(s), and with a starting time and end time for these tasks. The operating mode may thus be used to assign manageable machines, operators (if any, as manageable machines may be automated and operated by a computer system) and resources to respective manufacturing tasks. Then the factory may be operated according to the determined operating mode, for example by implementing the instructions and assignments. The operation mode yielded by the method (e.g., in the form of a schedule) is viable, feasible, and realistic, as the method handles multiple manufacturing tasks, involving for example multiple machines and operators, that are performed at the same time, which is precisely what happens in the real industrial world.

Now, the method determines the operating mode based on several inputs. The inputs comprise inputs related to the factory: the one or more manufacturing tasks, represented (i.e., modelized) each by an evolution law involving one or more manageable machines and resources, and one or more operators (if any, as previously discussed), the one or more manufacturing constraints, and the one or more manufacturing events. The inputs may further comprise inputs concerning the factory, such as a list of the machines of the factory and a list of operators (i.e., workers and/or computer systems as previously discussed) of the factory. The inputs further comprise an input related to a product to manufacture, i.e., the one or more constraints on the product. Based on these inputs the method determines the operating mode by seeing the manufacturing tasks for the manufacturing of the product as evolution laws which evolve in time, given the inputs, the time evolution representing the manufacturing evolution of the product. Specifically, the method ranks the manufacturing tasks according to their propensities, which are frequencies with which task are chosen in the manufacturing process of the product given the constraints. These propensities thus give priority to some tasks and not others. The method then executes the tasks in the descending order of their propensities, i.e., prioritized tasks are executed first. In other words, the method executes the tasks seen as a set of systems evolving according to evolution laws having priorities over one another.

This manner of executing in time and sequentially the manufacturing tasks enables a particularly efficient and robust determination of the operating mode, notably as manufacturing events, which ought to stop the execution of the tasks, are taken into account as perturbations of the different evolution laws evolving with priorities over one another. Specifically, upon occurrence of a manufacturing event (e.g., a lack of resources, a machine failure, an electric failure, a reached threshold for a quantity of the product or the end of execution of the task), the method goes back to the computation of the propensities and re-executes then the tasks according to their newly computed propensities. In other words, the method considers the factory/production system (i.e., the set of tasks) an autonomous system that can be simulated in real-time. As a matter of fact, the method simulates the time evolution of this autonomous system. As simulated by the method, this autonomous system evolves according to evolution laws having priorities over one another and the occurrence of a manufacturing event is seen as a perturbation of the time evolution of the set of systems which imparts to recompute the priorities. This allows to consider in real-time the occurrences of manufacturing events in the determination of the operating mode, with at each occurrence, an adaptation of the sequence of execution of the tasks until the next occurrence. In other words, the method determines the operating mode by adapting in real-time the organization of the manufacturing tasks to the occurrences of manufacturing events. Consequently, when used to operate the factory, the operating mode, being implemented, makes the operation of the factory robust to (e.g., unexpected or sudden) events and adaptable in real-time to these events. The autonomous system simulated by the method is robust and constantly reacting to unpredictable external perturbations and does not need a re-computation/resetting of the system when the perturbations occur.

The operation mode yielded by the method may for example allow to adapt (e.g., automatically) the factory to safety emergencies, and more generally to events threatening the safety of functioning of the factory. The operation mode may in other words allow to improve the safety of the factory. For example, the operation mode may allow an automated factory to automatically stop and to automatically trigger a safety emergency procedure upon occurrence of an event which is safety-threatening. Additionally or alternatively, the operation mode may comprise an improved safety emergency procedure that allows operators to quickly react to the occurrence of a safety-threatening event. In yet other examples, the method can ensure that enough workers or employees are present in the factory at the same time to watch the factory, for safety. Additionally or alternatively, the responsiveness of the method allows to ensure quality of the product being manufactured. The manufacturing of the product may indeed be constrained by the fact that the manufacturing tasks must be executed sequentially and within a certain time. For example, this may be the case when the manufacturing of the product requires the execution of molding and demolding operations, the demolding operations occurring after the molding operations. The method may adapt the operation of the factory to occurring events so that impact of these events on this sequential and specific execution of the tasks is reduced. In yet other cases, for example in the context of a process-type industry (which is discussed hereinafter), the product manufactured by the factory, or intermediate states thereof, may feature expiry constraints. For example, the product or intermediate states thereof (e.g., chemical components) must not be stored too long in the factory, otherwise quality damages may occur. The method can handle such constraints, as further discussed hereinbelow, thereby preserving quality of such products.

Furthermore, the method does not require an input a priori schedule of execution of the manufacturing tasks. The set of manufacturing tasks evolves by itself during the iterations performed by the method, constantly and in real-time adapting itself to the occurrences of events. This allows to use the operating mode determined by the method to automatically operate an automated factory, as previously discussed. The automated factory executing the operating mode will then constantly and in real-time adapt itself to the occurrences of events. Because of its adaptability to events occurrences, the method yields a determined operating mode which tends to optimize, given events occurring, the assignments of machines, operators (if any) and resources within the process for manufacturing the product. Operating the factory with the determined operating mode thereby allows for resources economy, energy economy, increased production rates, and optimized use of the machines and operators.

Surprisingly, the evolution law of a manufacturing task may be modelized well as a chemical reaction. Indeed, the time evolution of a manufacturing task has been found by the inventors to be modelized well as a chemical reaction, with the resources, the machine(s) involved in the task and the operators involved in the task (if any, as previously discussed), and the current state of the product being manufactured, playing the role of the reactants of the chemical reaction, and with the machine(s) involved in the task and the operators involved in the task (if any, as previously discussed), and the next state of the product being manufactured, playing the role of the result of the chemical reaction. The inventors have notably established a surprising striking resemblance between the production of proteins inside living cells and actual manufacturing processes.

The method may thus determine an operating mode of the factory by considering factories/manufacturing systems as autonomous biochemical processes, each task being seen by the method as a chemical reaction, involving machine(s), operator(s) (if any), the object being produced, and resources. The propensities of the tasks correspond to the propensities/speed of beginning of chemical reactions, and these propensities are constantly adapted to the occurrences of events, so that the set of manufacturing tasks always adapts itself to the current situation of the factory, just like a set of chemical reactions (also referred to as "reactor") would constantly adapt itself to perturbating events. In other words, unlike in the prior art optimization approaches, the factory evolves by itself.

The method is for operating a factory.

By "operating a factory", it is meant that the method yields an operating mode of the factory. The method may yield more than one such operating modes, for example when the method is repeated with different inputs and/or for different products to manufacture. The method may thus comprise a step of outputting S260 the operating mode of the factory determined by the method. In the present disclosure, an operating mode refers to a set of instructions and settings for operating (that is, to be executed) the factory for manufacturing the product given the constraints. The operating mode may for example comprise one or any combination of:
  a schedule of the factory for manufacturing the product given the constraints. The schedule may include a schedule of availability of the manageable machines of the factory. The schedule may include a schedule of the operators, including for example a schedule of the workers and/or a schedule of availability of computer systems operating machines. The schedule may include a schedule of delivery of resources for manufacturing the product. The schedule may include occurrences of manufacturing events;
  assignments. The assignments may comprise assignments of manageable machines to manufacturing tasks, e.g., given the schedule. The assignments may comprise assignments of operators to manageable machines for performing manufacturing tasks, e.g., given the schedule. The assignments may comprise an allocation of resources to manufacturing tasks, e.g., given the schedule;
  manufacturing instructions. The manufacturing instructions may include general manufacturing instructions for manufacturing the product, for example instructions on the quantity, quality and/or type of the product to manufacture. The manufacturing instructions may include specific manufacturing instructions for manufacturing the product, i.e., manufacturing instructions given to specific operators and/or machines for performing specific tasks.

The operating mode may form a computer-implemented data structure (e.g., a file). The operating mode may be used to operate the factory. For example, using the operating mode determined by the method, the method may further comprise assigning, i.e., in the real world factory, manageable machines and resources to respective manufacturing tasks. The method may also comprise assigning operators to respective manufacturing tasks, using the determined operating mode. The method may then comprise operating the factory using the determined operating mode, i.e., according to the determined operating mode, e.g., by following a schedule, assignments and/or instructions therein. The factory may be an automated factory. In such a case, the outputting S260 of the determined operating mode may consist in transmitting automatically the determined operating mode to a computer system operating the automated factory. Upon receipt of the transmitted operating mode, the computer system may store the operating mode and/or (e.g., later) read the operating mode, the reading of the operating mode resulting in assignments of automated machines and resources to manufacturing tasks and in the automatic operation of the factory using the operating mode. The computer system may for example cause the automated factory's machines to execute automatically the manufacturing tasks necessary to the manufacturing of the product by following the schedule, assignments and/or instructions included in the determined operating mode.

The factory may be any type of factory. A factory is a building or a set of buildings where (e.g., large amounts) of goods (e.g., of various types) are made using machines operated by operators (e.g., humans and/or computer systems). The factory may also be referred to as "a plant". The factory may be a "workshop" or a "warehouse". The factory may be a production chain. The factory may be an automated factory, such as an automated production chain. The factory may be configured for manufacturing any type manufacturing product, such as a (e.g., mechanical) part or assembly of parts (or equivalently an assembly of parts, as the assembly of parts may be seen as a part itself from the point of view of the method), or more generally any rigid body assembly (e.g., a mobile mechanism). The factory may be configured for the manufacturing of products in various and unlimited industrial fields, including: aerospace, architecture, construction, consumer goods, high-tech devices, industrial equipment, transportation, marine, and/or offshore oil/gas production or transportation. The product(s) manufactured by the factory may be any mechanical part, such as a part of a terrestrial vehicle (including e.g., car and light truck equipment, racing cars, motorcycles, truck and motor equipment, trucks and buses, trains), a part of an aerial vehicle (including e.g., airframe equipment, aerospace equipment, propulsion equipment, defense products, airline equipment, space equipment), a part of a naval vehicle (including e.g., navy equipment, commercial ships, offshore equipment, yachts and workboats, marine equipment), a general mechanical part (including e.g., industrial manufacturing machinery, heavy mobile machinery or equipment, installed equipment, industrial equipment product, fabricated metal product, tire manufacturing product), an electro-mechanical or electronic part (including e.g., consumer electronics, security and/or control and/or instrumentation products, computing and communication equipment, semiconductors, medical devices and equipment), a consumer good (including e.g., furniture, home and garden products, leisure goods, fashion products, hard goods retailers' products, soft goods retailers' products), a packaging (including e.g., food and beverage and tobacco, beauty and personal care, household product packaging). Any product manufactured by the factory may be or include (e.g., as components of the product) one or more of a molded part (i.e., a part manufactured by a molding process), a machined part (i.e., a part manufactured by a machining process), a drilled part (i.e., a part manufactured by a drilling process), a turned part (i.e., a part manufactured by a turning process), a forged part (i.e., a part manufactured by a forging process), a stamped part (i.e., a part manufactured by a stamping process) and/or a folded part (i.e., a part manufactured by a folding process).

The factory may also be a factory in a process-type industry, i.e., an industry of which products may undergo chemical transformations, such as the paper industry, the chemical industry, the cosmetics industry, the pharmaceutical industry, or the agri-food industry. Any product manufactured by the factory may thus by any product in these industries, such as a chemical product, a pharmaceutical product, a cosmetic product, an agri-food product, or a paper product. Such a product may feature expiry constraints, e.g., the finished product or intermediate states thereof cannot be stored too long in the factory, otherwise, quality damages could occur.

In an example of the method, the factory is a factory specialized in manufacturing car parts, i.e., mechanical parts of a car. The factory of this example is specialized in manufacturing brake assemblies for cars, for example brake assemblies each including a brake caliper, brake pads and a rotor/spinning disc. The brake caliper is fitted with the brake pads to grab the rotor. The brake caliper is mounted to a vehicle with a bracket so that it frames the rotor. The caliper includes the brake pads, the brake pads being metal plates bonded with material that provides stopping friction. The factory of this example is automated.

The factory includes manageable machines each configured for performing at least a part of a manufacturing task, a manufacturing task executing a part of a manufacturing process, also referred to as "a manufacturing step". A machine is an apparatus or a set of apparatuses capable of performing a manufacturing task, either by being operated by a computer or in an autonomous manner. A manageable machine is a machine that can be managed, i.e., the settings and parameters of the machine are modifiable. The machine may be managed by one or more operators. For example, the machine may be managed by workers which modify the settings and parameters of the machine by hand (e.g., from distance with a computer) and may be operated by the workers (at least partially) by hand for performing a manufacturing task. Alternatively, the machine may be partially automated. For example, the machine's settings and parameters may be modified by a worker, e.g., from distance with a computer, but upon launching of the machine by the worker, the machine may execute at least a part of a manufacturing task by itself, automatically. The machine may nevertheless comprise control commands (such as an emergency stop command) actionable by a human operator (i.e., a worker) of the machine. The machine may in yet another alternative by a fully automated machine, i.e., the machine is fully automatically monitored by a computer system which sets the machine's parameters, launches the machine, and controls the machine (e.g., the computer system may initiate an emergency stop procedure automatically).

Each machine herein performs, i.e., by itself or together with other machines, a manufacturing task: the machine (e.g., possibly managed and operated by one or more operators), given a state of the product to manufacture (i.e., a part of the product or separated parts of the product, or the product itself but unfinished) and resources, transforms the product into another state (e.g., the part of the product is modified or assembled with other parts, or the unfinished product itself is modified). Any machine herein may execute a manufacturing task unitarily, i.e., sequentially and product by product. Alternatively, any machine herein may execute a manufacturing task simultaneously on a batch of products. The resources may include one or more pieces (e.g., in a raw state, or in a transformed state) of the following materials:

- organic materials or organic polymers, i.e., materials formed in long carbon chains, such as wood, cotton, wool, paper, cardboard, plastic matter, rubber, and leather;
- metallic materials, i.e., materials involving a metallic bond, i.e., metals and metal alloys, comprising or consisting in iron, aluminum, steel, copper, bronze, gold, silver and/or cast-iron;
- composite materials, such as plastics reinforced with glass fibers, carbon fibers or Kevlar fibers, concrete, reinforced concrete and plywood; and/or
- mineral or ceramic materials, such as rocks, natural stones, ceramics, plaster, brick, glass and minerals.

The resources may also include water supplies, gas supplies, electricity supplies and/or one or more chemical products (such as paint or coloring agent). The resources may further include prefabricated components of the product, such as prefabricated electric or electronic components (e.g., circuits).

Any machine herein may be:

- a machining tool (i.e., a tool carrying out at least a part of a machining process), such as a broaching machine, a drill press, a gear shaper, a hobbing machine, a hone, a lathe, a screw machine, a milling machine, a sheet metal shear), a shaper, a saw, a planer, a Stewart platform mill, a grinding machine, a multitasking machine tool (e.g., with many axes that combine turning, milling, grinding, and/or material handling into one highly automated machine tool);
- a compression molding machine (i.e., a machine carrying out at least a part of a compression molding process), typically comprising at least a mold or a molding matrix such as a flash plunger-type mold, straight plunger-type, or a landed plunger-type mold;
- an injection molding machine (i.e., a machine carrying out at least a part of an injection molding process), such as a die casting machine, a metal injection molding machine, a plastic injection molding machine, a liquid silicon injection molding machine, or a reaction injection molding machine;
- a rotary cutting tool (e.g., carrying out at least a part of a drilling process), such as a drill bit, a countersink, a counterbore, a tap, a die, a milling cutter, a reamer, or a cold saw blade;
- a non-rotary cutting tool (e.g., carrying out at least a part of a turning process), such as a tipped tool or a form tool;
- a forging machine (i.e., carrying out at least a part of a forging process), such as a mechanical forging press (typically comprising at least one forging die), a hydraulic forging press (typically comprising at least one forging die), a forging hammer powered by compressed air, a forging hammer powered by electricity, a forging hammer powered by hydraulics, or a forging hammer powered by steam;

a stamping machine (i.e., carrying out at least a part of a stamping process), such as a stamping press, a machine press, a punching machine, a blanking machine, an embossing machine, a bending machine, a flanging machine, or a coining machine;

a bending or folding machine (i.e., carrying out at least a part of a bending or folding process), such box and pan brake, a press brake, a folder, a panel bender or a machine press;

a spot welding robot; or an electrical painting tool (i.e., carrying out at least a part of a painting process of a product), such as a (e.g., electrical) automotive painting robot.

In the previously-discussed example of the factory producing brake assemblies, the machines include metal molding machines each for molding a rotor. The machines also include metal molding machines each for molding a brake caliper. The machines also include metal molding machines each for molding a brake pad. The machines also include injection-molding machine each for molding rubber to bond brake pads. The machines also include drilling machines each for drilling a circular pattern of holes in the rotor, the holes being configured for receiving a wheel stud when the brake assembly is to be mounted on a wheel. The machines also include an assembly chain where the pads, the caliper and the rotor are assembled for forming a brake assembly adapted for being mounted on a wheel. The resources of the factory thus include metal constitutive of the rotors, brake calipers and brake pads, for example cast iron. The resources of the factory also include rubber for bonding the brake pads. The resources also include water and electricity, which are required for the machines to function. The machines of the factory of this example altogether form a production chain which uses metal, such as cast iron, and rubber to transform them a in a brake assembly.

Referring back to FIG. 1, as previously explained, the method comprises, before the determining S20 of the operating mode of the factory, the providing S10 of inputs for determining the operating mode.

The inputs include one or more manufacturing constraints. A manufacturing constraint is a constraint relative to the manufacturing operations performed in the factory. The providing S10 of the one or more manufacturing constraints may be carried out by a user, e.g., which defines the data describing the constraints. The one or more manufacturing constraints may be provided as a list, each item of the list being a constraint and being for example associated with data describing the constraint. The one or more manufacturing constraints may include one or more of the followings:

a maximal number of operators in the factory;

a time required between execution of two manufacturing tasks, for example a short time, e.g., to avoid expiry of a product or of a component thereof;

ensuring that a specific operators is present for one or more manufacturing tasks;

ensuring that two tasks are not executed at the same time, e.g., for avoiding risks of explosions;

ensuring that two tasks are executed at the same time;

a priority given to the speed of production or to the economy of costs;

a maximal amount of electricity, water and/or gas consumption in a predetermined time frame;

a minimal amount of electricity, water and/or gas supply for the correct functioning of the factory;

a maximal amount of resources that can be stored at the same time in the factory;

a minimal space that ought to be free around one or more machines;

and/or a maximal amount of a product and/or of intermediate states of a product that can be stored at the same time in the factory.

In the previously discussed example of the factory for manufacturing brake assemblies, the manufacturing constraints may include a maximal amount of brake pads, calipers and/or rotors that can be stored at the same time in the factory. Specifically, since the machines of the factory altogether form an automated chain of production, it is required that not too many separated components of the brake assembly be stored at the same time, as it might cause perturbation of the chain of production. Similarly, the constraints may include a maximal amount of finalized brake assemblies that can be stored in the factory.

The inputs also includes one or more manufacturing events. A manufacturing event is an event that occurs within the manufacturing of a product and that has an impact on the manufacturing of the product. The providing S10 of the one or more manufacturing event may be carried out by a user, e.g., which defines the data describing the event. The event may be an unexpected event, such as:

one or more machine failures;

an electricity, gas, and/or water cut;

one or more unexpected absent workers;

a production order (e.g., due to a customer demand), such as an unexpected order that takes priority over the product currently being manufactured. The order may include a number of products to manufacture and their due date, and the tasks that have to be performed to manufacture these products;

a network failure (e.g., in the case of an automated factory), a fire emergency;

a gas explosion;

a variation in the air within the factory, such as a change of temperature or of hygrometry, for example in the pharmaceutical or agri-food context;

an unplanned safety check; and/or a worker health issue and/or injury and/or a lack of resources (e.g., because of a missed delivery).

In the previously-discussed example of the factory for manufacturing brake assemblies, the unexpected events may include a failure of the assembly chain where the brake parts are ultimately assembled, and/or a fire caused by one of the metal-molding machines.

The event may also be an expected event or an event that is supposed to occur during the manufacturing of the product, such as:

one or more manufacturing tasks are completely executed;

a product has been manufactured in a sufficient number/ desired number of copies;

a planned shift change of operators;

a planned shift change of a machine (e.g., machine maintenance);

a planned safety check;

the arrival of a new operator on a machine;

the arrival of a new machine;

a maintenance operation, i.e., resulting in the withdrawal of one or more machines;

a safety control; and/or a break of at least some workers (such as a lunch break or a day-off).

In the previously-discussed example of the factory for manufacturing brake assemblies, the expected events include a safety control of the machines of the factory, a maintenance operation, and/or the end of some tasks.

The one or more manufacturing events may be provided as a list, each item of the list being an event and being for example associated with data describing the event.

The inputs also include one or more manufacturing tasks. A manufacturing task is a part of a manufacturing process, i.e., a manufacturing task may correspond to a portion/step of a manufacturing process or may be the manufacturing process itself, from end to end. The manufacturing of the product may include one or more manufacturing processes (e.g., several parts of the product are made by several different manufacturing processes and there may be one or more manufacturing processes to assemble the parts together), each manufacturing process being a sequence of one or more manufacturing tasks. The one or more manufacturing tasks may be provided as a list, each item of the list being a task and being for example associated with data describing the task. The data describing the task may for example include features of the task, such as duration of the task, energy consumption of the task, resources needed to execute the task, working qualifications required to execute the task, and/or time to reconfigure a machine previously used in order to use again this machine to execute the task.

Each manufacturing task is represented by an evolution law that describes a manufacturing step of a product by one or more manageable machines using resources. The manufacturing task may thus be provided at S10 with data describing the evolution law. The evolution law is a transformation that takes inputs and that yields at least one output based on the inputs. that the evolution law takes as input:
- a current state of the product, i.e., a state of the product before undergoing the manufacturing task, consumed by the manufacturing task. The current state may consist of several parts/components of the product to assemble together and/or of an unfinished state of the product;
- one or more manageable machines for executing the task, the one or more machines altogether transforming the current state of the product into a next state;
- one or more operators for operating the machines which are not automated (if any); and
- resources (also referred to as supplies) required for performing the task, i.e., consumed by the task, i.e., resources used by the machines to transform the current state of the product into a next state.

The evolution law outputs the next state of the product, the machine(s) and the operator(s) if any.

In the previously-discussed example of the factory, the one or more manufacturing tasks include the followings:
- rotor molding, where metal molding machines use metal (e.g., cast iron) and the resources they need to function (e.g., electricity) to mold rotors;
- caliper molding, where metal molding machines use metal (e.g., cast iron) and the resources they need to function (e.g., electricity) to mold calipers;
- pad molding, where metal molding machines use metal (e.g., cast iron) and the resources they need to function (e.g., electricity) to mold pads;
- rotor drilling, where drilling machines drill a circular pattern of holes on each rotor so that the holes are adapted to receive each a wheel stud, the drilling machines needing electricity to function to drill the rotors;
- rubber injection-molding, where rubber injection-molding machines use rubber (e.g., cast iron) and the resources they need to function (e.g., electricity) to mold rubber parts to bond the pads; and
- final assembling, where the assembly chain bounds the rubber parts on the pad (e.g., one on each side of each pad at the area of friction between the pad and the caliper), and assembles, with each drilled rotor, two rubber-bonded pads and one caliper.

As, in this example, the factory is automated, a computer system supervises all the manufacturing tasks (and the production chain altogether) and operates each machine. There is thus no operator involved in the tasks besides the computer system.

The user may provide S10 the manufacturing task(s), for example by providing the evolution law, e.g., by coding the evolution law. In examples, the providing S10 of the one or more manufacturing task(s) comprises, for each manufacturing task, defining the evolution law by representing the manufacturing task by a chemical reaction. The chemical reaction is of the type:

$$M+R+S_n => IS$$

$$IS => M+S_{n+1},$$

where M represents the one or more manageable machines, R represents the resources, $S_n$ represents a state of the product before execution of the manufacturing task (i.e., a current state of the product), IS represents the product while being transformed by the manufacturing task, and $S_{n+1}$ represents a state of the product after execution of the manufacturing task (i.e., a next state of the product, which may also be referred to as "the new state", and which is closer to the product in its final state than the current state).

In the previously-discussed example of the factory:
- for the rotor molding task, M represents metal molding machines, R represents metal and the resources needed by the molding machines to function (e.g., electricity), $S_n$ represents the metal before molding (e.g., raw pieces of cast iron), and $S_{n+1}$ represents the molded rotors;
- for the caliper molding task, M represents metal molding machines, R represents metal and the resources needed by the molding machines to function (e.g., electricity), $S_n$ represents the metal before molding (e.g., raw pieces of cast iron), and $S_{n+1}$ represents the molded calipers;
- for the pad molding task, M represents metal molding machines, R represents metal and the resources needed by the molding machines to function (e.g., electricity), $S_n$ represents the metal before molding (e.g., raw pieces of cast iron), and $S_{n+1}$ represents the molded pads;
- for the rotor drilling task, M represents drilling machines, R represents the resources needed by the molding machines to function (e.g., electricity), $S_n$ represents the molded rotors before drilling, and $S_{n+1}$ represents the drilled rotors;
- for the rubber injection-molding task, M represents rubber injection-molding machines, R represents rubber and the resources needed by the molding machines to function (e.g., electricity), $S_n$ represents the rubber before molding (e.g., raw pieces of rubber), and $S_{n+1}$ represents the molded rubber parts to bond the pads; and
- for the final assembling task, M represents the machines of the assembly chain, R the resources needed by these machines to function (e.g., electricity), $S_n$ represents altogether the drilled rotors, the molded pads, the molded rubber parts, and the molded calipers, and $S_{n+1}$ represents the final brake assemblies.

If the manufacturing task involves one or more operators for operating the one or more manageable machines, the chemical reaction may be of the type:

$$M+O+R+S_n => IS$$

$$IS => M+O+S_{n+1},$$

where M represents the one or more manageable machines, O represents the one or more operators, R represents the resources, $S_n$ represents the state of the product before execution of the manufacturing task, IS represents the product while being transformed by the manufacturing task, and $S_{n+1}$ represents the state of the product after execution of the manufacturing task.

Figure 2:
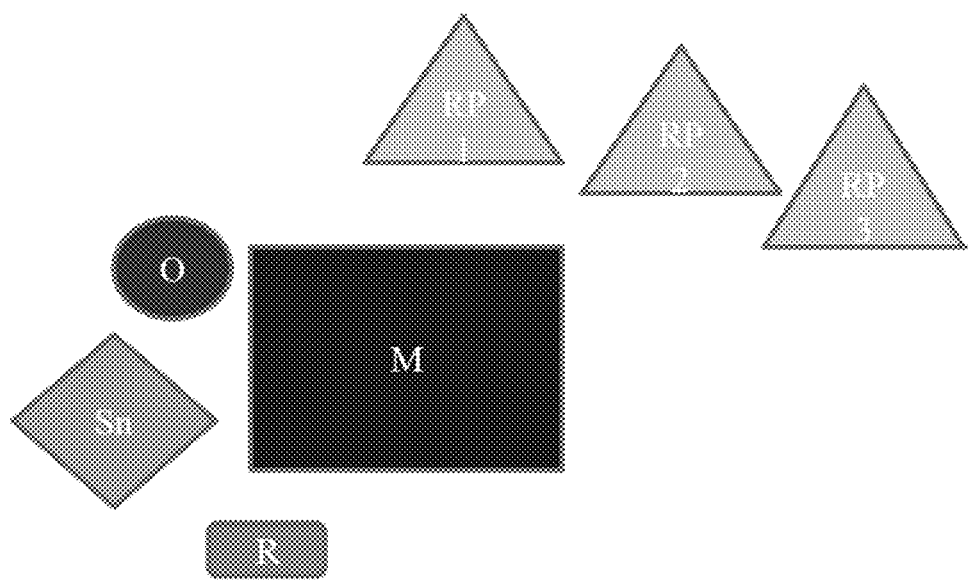
FIGS. 2, 3, and 4 illustrate the method.

FIG. 2 shows a schematic illustration of a manufacturing task represented as a chemical reaction. O (the operator(s)), M (the machine(s)), R (the resources), Sn (the current state of the product) play the roles of the reactants. RP1, RP2 and RP3 (the constraints) are exterior constraints on the chemical reaction (e.g., temperature or pressure).

In the real-world manufacturing process of the product, two tasks may have to be synchronized: a second task T2 must start shortly (e.g., in a time frame having a length lower than a predefined threshold) after the end of a first task T1, or shortly (e.g., in a time frame having a length lower than a predefined threshold) after the start of the task T1, or at the start of the task T1. The method may integrate such synchronized tasks by representing the two tasks as a single manufacturing task, with a single evolution law representing altogether the execution of the two tasks. The single evolution law may be a concatenation of the evolution laws of the two tasks. The single task may only start if all the resources required for the two tasks are available. The method also handles in the same manner the case of three or more tasks which must be synchronized. For example, a task T3 may have to start (e.g., shortly) after another task T2, which itself may have to start (e.g., shortly) after another task T1. In yet other examples, T3 and T2 must be executed simultaneously, and (e.g., shortly) after execution of T1. The method integrates these three or more synchronized tasks by representing them as a single task, with a single evolution law. As for the case of two synchronized tasks, the single evolution law is a concatenation of the evolution laws of the three or more tasks. The concatenation allows to book and save the resources and the machines, and the operators if any, necessary to execute the synchronized tasks, as their attribution to other tasks is prevented while the synchronized tasks are executed The chemical reaction for synchronized tasks is works as follows. Let T1 and T2 be two tasks that must be synchronized. Let $$M1+R1+S_n => IS1$$

$$IS1 => M1+S_{n+1},$$

be the chemical reaction for the task T1, where M1 represents the manageable machine(s) for task T1, R1 represents the resources for task T1, $S_n$ represents the state of the product before execution of T1, IS1 represents the product while being transformed by T1, and $S_{n+1}$ represents the state of the product after execution of T1. Let $$M2+R2+S_{n+1} => IS2$$

$$IS2 => M2+S_{n+2},$$

be the chemical reaction for the task T2, where M2 represents the manageable machine(s) for task T2, R2 represents the resources for task T2, $S_{n+1}$ represents the state of the product before execution of T2, which is the result of T1, IS2 represents the product while being transformed by T2, and $S_{n+2}$ represents the state of the product after execution of T2. Then the chemical reaction for the single task T representing the synchronization of T1 and T2 is the concatenation of the two previous chemical reactions, as follows:

$$M1+M2+R1+R2+S_n => IS$$

$$IS => M1+M2+S_{n+2}.$$

The chemical reaction for an arbitrary number of (i.e., three or more) synchronized tasks is given by a similar formula: it is the iterative concatenation of the chemical reactions of the tasks. It is to be noted that the operators have not been represented in this discussion on the concatenation of chemical reactions, for simplicity. It is to be understood that the discussion applies equally to tasks involving operators, the operators being integrated in the chemical reaction as previously explained for the case of a tasks involving one or more operators.

The inputs provided at S10 may further comprise a list of manageable machines of the factory, each item of the list being a machine of the factory and being for example associated with data describing the machine. The data may include the type of the machine and an associated list of manufacturing task(s) that the machine can perform. The inputs provided at S10 may further comprise a list of operators of the factory, each item of the list being an operator and being for example associated with data describing the operator. The data may include a list of the manufacturing task(s) that the operator can perform and/or a list of the manageable machine(s) that the operator can operate and manage. For example, young apprentices have less knowledge than experienced workers, and can use a lesser number of machines. The inputs provided at S10 may further comprise a list of resources/supplies of the factory, each item of the list being a resource/supply and being for example associated with data describing the resource/supply.

Referring back to FIG. 1, after the providing S10 of the inputs, the method determines S20 an operating mode of the factory based on (i.e., using) the inputs. The determining is also based on (i.e., also uses) one or more constraints on the product to manufacture. The one or more constraints may thus form a parameter of the determining S20. The parameter may be fixed (i.e., the factory always has the same constraints on the product to manufacture) or may be settable, e.g., by a user. For example, the user may provide or set the one or more constraints before the determining S20. The one or more constraints on the product to manufacture may comprise one or more of:
- a number of copies of the product to manufacture,
- a deadline/maximal period for manufacturing all the copies of the product, and/or
- specifications of the product, such as specifications that deviate from the standard specifications of the factory (e.g., special painting, special mechanical characteristics, special electronic characteristics, or special physical performances).

The one or more constraints may be in the form of a work order, which describes which product must be manufactured, in which quantity and for which due date. The work order may be in the form of a hypergraph of the product that the factory is to manufacture when executing the work order. The hypergraph may comprise first nodes each representing a state of the product and second nodes each representing a task transforming a state of the product into a new state of the product.

Figure 3:
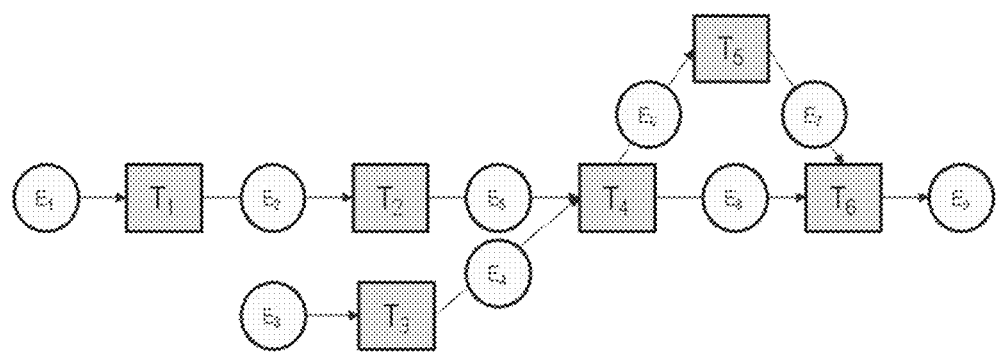

FIG. 3 shows a schematic representation of a hypergraph for manufacturing a brake assembly in the previously-discussed example of the factory manufacturing brake assemblies. The work order includes a quantity of brake assemblies, represented as node $E_9$, to produce for a certain due date, based on an initial state $E_1$, $E_3$ of the brake assembly. The initial state corresponds to an amount of raw pieces of metal (e.g., cast iron) $E_1$ for molding the rotor, the brake pads and the brake caliper, and to an amount of raw pieces of rubber $E_3$ to mold the rubber parts.

Node $T_1$ represent the molding tasks for molding rotors, the brake pads and brake calipers. The molding tasks for these three mechanical parts, although different because executed by different metal molding machines, are represented as a single task $T_1$ in FIG. 3, for simplicity. Node $T_1$ thus corresponds to the set of molding tasks that transform the raw pieces of metal $E_1$ into molded brake pads, brake calipers, and rotors. Node $E_2$ represents an intermediate state of the brake assembly corresponding to the separated molded brake pads, molded brake calipers, and molded rotors.

Node $T_2$ represent the rotor drilling task, where drilling machines drill holes in rotors (corresponding to node $E_2$), which results in drilled rotors. Node $E_5$ represents an intermediate state of the brake assembly corresponding to the separated molded brake pads, molded brake calipers, and drilled molded rotors.

Note $T_3$ represents the rubber injection-molding task, where raw pieces of rubber $E_3$ are injection-molded into rubber parts to bond brake pads. Node $E_4$ corresponds to the molded rubber parts. It is to be understood that task $T_3$ may be executed independently from tasks $T_1$ and $T_2$, for example while these tasks are executed, before their execution, or after it.

Node $T_4$ corresponds to an optional task of painting components of the brake assembly in their current states $E_4$ and $E_5$, if the work order includes instructions for painting the components. Nodes $E_6$ and $E_8$ correspond, respectively, to the (e.g., painted) brake pads and rubber parts, and the (e.g., painted) calipers and drilled rotors.

Node $T_5$ and $T_6$ correspond to the final assembling task, which comprises two assembling subtasks $T_5$ and $T_6$ which are synchronized, i.e., $T_5$ and $T_6$ start at the same time here. Node $T_5$ represents a first assembly task where brake pads and rubber parts $E_6$ are assembled. Node $T_6$ represents a second assembly task where the assembly of the brake pads and the rubber parts $E_6$ is assembled with the calipers and drilled rotors $E_8$. Node $E_9$ represents the final brake assemblies.

It is to be understood that the order of the tasks for the brake assembly factory discussed with reference to FIG. 3 corresponds to a given work order. Another work order could have yielded a different organization of the execution of the tasks.

Figure 4:
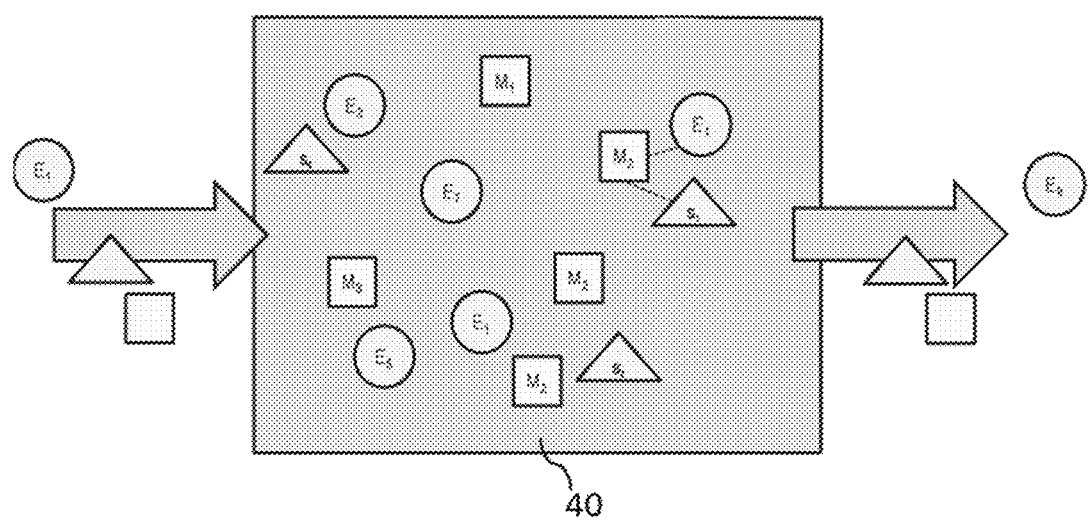

FIG. 4 shows a schematic representation of an instant in time of the manufacturing process executing the order formed by the hypergraph of FIG. 3, the manufacturing process being represented as an autonomous system of chemical reactions, each representing a task. The shopfloor 40 plays the role of the chemical reactor. FIG. 4 shows for example molding machines $M_2$ which, using raw pieces of metal $E_1$ and supplies $S_1$, mold the brake calipers, brake pads and rotors $E_2$. Machines $M_1$ and $M_3$ correspond to machines currently non-used as the manufacturing process is at a time where only machines $M_2$ are to function. Similarly supplies $S_2$ and $S_6$ are currently non-used. Stocks of intermediate states $E_2$, $E_7$ and $E_5$, which are also currently non-used while machines $M_2$ are working, are also represented on FIG. 4.

Still referring to FIG. 1, the determining S20 proceeds by iterations S250, which may be referred to as "iterations S250 of the determining S20" hereinafter. Each iteration corresponds to an interval of time of the manufacturing process, which has a start time (which may be referred to as "an instant" of the determining S20) and which ends upon occurrence of a manufacturing event or when all the tasks required for manufacturing the product have been executed.

Still referring to FIG. 1, in the first iteration, the determining S20 computes S200 the propensities of the manufacturing tasks given the constraints, i.e., the determining computes a frequency with which the task is chosen for manufacturing the product given the constraints. In other words, at each instant (i.e., each iteration), the determining S20 checks the lists of tasks that can occur and compute their propensities. Then the determining S20 ranks S210 the tasks according to a descending order of their propensities, i.e., the task with the highest propensity tends to be ranked first, the task with the second highest propensity tends to be ranked second, and so on. The ranking S210 thus forms a stack of tasks. Then the determining visits S220 the tasks according to this order and affects them machines and resources for execution, i.e., machines and resources are affected first to the tasks with high propensities. Then the determining executes S230 the task, i.e., each task in the stack starts. The execution S230 of the tasks is carried out until an occurrence of a manufacturing event, such as an expected/planned event (e.g., a task is finished) or an unexpected event (e.g., a power cut or a worker injury). The execution S230, if not interrupted/stopped by the occurrence of a manufacturing event, can proceed until there remains not task to execute.

Still referring to FIG. 1, upon occurrence of an event, the execution S230 stops and the determining S20 performs a next iteration S250. In other words, the determining S20 loops back to the computing S210 of the propensities. As illustrated on FIG. 1, a next iteration S250 may follow step S230 or S240, depending on whether step S240 occurs or not. Then the determining re-ranks S210 the tasks according to a descending order of the re-computed propensities, re-visits S220 the tasks according to the ranking to affect to them machines and resources and re-executes S230 the tasks until an occurrence of a manufacturing event, where the determining S20 loops back to a next iteration S250, and so on. In other words, each iteration S250 of the determining S20 corresponds to a functioning of the factory during two manufacturing event occurrences, i.e., each iteration as of the second iteration (if any) represents an adaptation to the occurrence of a manufacturing event at the previous iteration. The determining S20 thereby constantly adapts the operating mode to event occurrences, whether the events are expected or not. In yet other words, the determining S20 follows a time calendar/schedule comprising events, and each time the determining S20 goes to a next event, the determining S20 loops back S250 and re-executes its steps, until all the events in the calendar/schedule have been met. Then the determined operating mode may be outputted S260.

Each iteration S250 may be associated with data, e.g., yielded as a result of the previous iteration, e.g., yielded by step S240, discussed hereinafter. The data may comprise a time of beginning of the iteration. The time may represent a point of time in the manufacturing process of the product.

The data may also comprise the manageable machines available at the time of beginning of the iteration, each machine being for example associated with time slots of availability. The data may also comprise the operators available at the time of beginning of the iteration, each operator being for example associated with time slots of availability. The data may also comprise the resources available at the time of beginning of the iteration, each resource (e.g., each component or each raw or transformed piece of material) being for example associated with time slots of availability and an available quantity per each time slot. The data may also comprise the current state of the product, e.g., as updated S240 and yielded by a previous iteration. In other words, upon occurrence of an event, the method may update the statuses of the resources, machines and operators affected by the event occurrence, and may thus update their quantity in the factory before proceeding with another computation of the propensities (i.e., in a next iteration).

For example, in the previously-discussed example of the factory manufacturing brake assemblies, during execution S230 of the tasks, a fire caused by one of the molding machines may cause this machine, and possible neighboring machines, to be unavailable (e.g., as a precautionary measure, for safety) for next molding tasks. Thereby, at the next iteration 250, the data associated with the iteration, e.g., as a result of the update performed at step S240, may include a list of the machines made unavailable by the fire. Thereby the production may carry on, but without these machines.

Prior to the one or more iterations S250, the determining S20 may comprise adapting the one or more manufacturing tasks to the constraints on the product to manufacture. This may comprise translating a production order (also referred to work order) of the object into a code integrating the one or more manufacturing tasks. For example, the production order of the object may comprise a sequence of manufacturing steps for manufacturing the object and translating the production order may comprise assigning to each manufacturing step a manufacturing task of the factory, together with data indicating the resources, the machines, and the operators (if any) required to execute the task for performing the manufacturing step. The translation of the production order may further comprise determining the constraints (if any) that will be taken into account for calculating the propensities using the production order.

Still referring to FIG. 1, an iteration S250 of the determining S20 is now described and discussed. It is to be understood that the discussion equally applies to any other iteration S250.

Still referring to FIG. 1, the iteration S250 comprises computing S200, for each manufacturing task, a respective propensity of the manufacturing task. The propensity represents a frequency with which the task is chosen for manufacturing the product given the constraints and/or a previous occurrence of one or more of the manufacturing events (i.e., an occurrence at the previous iteration). The propensity is a value representing the frequency. In other words, given the constraints and/or the previous occurrence, the propensity represents a likelihood (e.g., an eligibility, a popularity, or an expectancy) of the manufacturing task to be chosen to manufacture the product. Thereby, the higher a propensity of a manufacturing task, the more likely the manufacturing task will be to be chosen.

The propensity may be, for each manufacturing task, an increasing function of each of:
a number of the one or more manageable machines (i.e., the number of machines carrying out the task) available for executing the task (i.e., available before the execution S230 and during all the task's duration);
a quantity of a state of the product before the manufacturing step (e.g., the number of copies of the product in its current state, i.e., before the manufacturing step corresponding to the manufacturing task); and
an indicator that a quantity of the resources (i.e., required to perform the manufacturing step) is above a threshold of resources required for executing the manufacturing step.

Therefore, the higher the number of machines for executing the task is, the larger the value of the propensity is. Similarly, the higher the quantity of the state of the product before the manufacturing step is, the larger the value of the propensity is. The indicator may be an indicator function, that is a function that equals 1 when the quantity of the resources is above a threshold of resources required for executing the manufacturing step, and that equals 0 otherwise. Thereby the propensity is zero and the task cannot be performed if there are not enough resources.

For example, in the case of the brake assembly factory which has been previously discussed:
for each metal molding tasks, the propensity is an increasing function of the number of molding machines carrying out the task, the quantity of raw metal available before the molding, and an indicator that the quantity of raw metal is higher that a threshold (i.e., an indicator that there is a sufficient amount of raw metal for performing the molding);
for the injection-molding task, the propensity is an increasing function of the number of molding machines carrying out the task, the quantity of rubber available before the molding, and an indicator that the quantity of rubber is higher that a threshold (i.e., an indicator that there is a sufficient amount of rubber for performing the molding); and
for the final assembling task, the propensity is an increasing function of the number of machines carrying out the task, the quantity of each component of the brake assembly before the assembling, and an indicator that the quantity of each component is higher that a threshold (i.e., an indicator that there is a sufficient amount of component for performing the assembling, e.g., if there is no rotor, the assembling cannot begin).

For each respective one of one or more (e.g., all the) manufacturing tasks, each involving one or more operators, the function may also be an increasing function of a number of operators, available for executing the task (i.e., available before the execution S230 and during all the task's duration, of the one or more manageable machines. Thereby, the higher the number of operators for operating the machines executing the task is, the larger the value of the propensity for this task will be.

For each respective one of one or more (e.g., all the) manufacturing tasks, the function may also be an increasing function of a term rewarding respect of at least one of the constraints, i.e., a term tending to have a high value when the at least one constraint is respected. Thereby, the manufacturing task's propensity value increases if the execution of the manufacturing task respects the at least one constraint, i.e., is compatible with the at least one constraint.

The function may also be, for one or more manufacturing tasks (e.g., for each manufacturing task or for at least a part of them), an increasing function of a parameter for fostering (e.g., boosting, prioritizing, promoting, favoring, or encouraging) a slow and/or economical operation of the factory. In other words, for a given task, the parameter may be set to have a high value when the task corresponds to a slow and/or economical operating mode of the factory. To the contrary, for a given task, the parameter may be set to have a low value when the task corresponds to a fast and/or costly operating mode of the factory. By "slow", it is meant that the operation of the factory favors slow machines. By "economical", it is meant that the operation of the factory favors economical machines, e.g., machines economical in resources. The parameter may be set by a user (e.g., for each task, the user may choose whether the propensity must include this parameter and may set the value of this parameter). Tasks with a high value for this parameter will have a higher propensity than tasks with a low value for this parameter, and will thus be promoted over these other tasks, unless the small value for the parameter is compensated by another factor in the propensity (e.g., a high number of available operators). For example, a task executed with a slow and/or economical machine may have a large value for the parameter so as to prioritize (i.e., frequently choose) this task, to favor a slow and/or economical operating mode of the factory.

For each task, the function may be a product of its variables, i.e., a product of the number of the one or more manageable machines, the quantity of the state product before the manufacturing step, the indicator that a quantity of the resources is above a threshold of resources required for executing the manufacturing step, optionally the number of operators of the one or more manageable machines, optionally the term rewarding respect of at least one of the constraints, and optionally the parameter for fostering a slow and/or economical operation of the factory.

For example, when the evolution law is a chemical reaction of the type $$M+R+S_n => IS$$

$$IS => M+S_{n+1},$$

as previously discussed, the respective propensity of the manufacturing task is given by the formula:

$$P=[M][S_n]\{[R] \geq c\}[RP],$$

where P is the propensity, [M] is a number of the one or more manageable (i.e., available) machines, $[S_n]$ is the quantity of the state product before the manufacturing step, $\{[R] \geq c\}$ is the indicator that a quantity of the resources is above a threshold of resources required for executing the manufacturing step, c being the threshold, and [RP] is the term rewarding respect of at least one of the constraints ([RP] being set equal to 1 when there is no term rewarding respect of the constraints in the formula).

If the manufacturing task is executed by one or more operators operating the one or more manageable machines (i.e., the task is not automated), and the chemical reaction is of the type:

$$M+O+R+S_n => IS$$

$$IS => M+O+S_{n+1},$$

as previously discussed, the respective propensity of the manufacturing task is given by the formula:

$$P=[M][O][S_n]\{[R] \geq c\}[RP],$$

where P is the propensity, [M] is the number of the one or more manageable machines, $[S_n]$ is the quantity of the state product before the manufacturing step, $\{[R] \geq c\}$ is the indicator that a quantity of the resources is above a threshold of resources required for executing the manufacturing step, c being the threshold, [O] is the number of operators, and [RP] is the term rewarding respect of at least one of the constraints ([RP] being set equal to 1 when there is no term rewarding respect of the constraints in the formula).

For one or more manufacturing tasks, the propensity (i.e., given by one of the above formulae) may be multiplied by a parameter k for fostering a slow and/or economical operation of the factory, in the case where the propensity is an increasing function of this parameter, as discussed above. In other words, the parameter k may be a variable of the propensity for one or more tasks (e.g., some of them or all of them), so that attributing different values to k for different tasks allows to modify the values of their propensities relatively to one another. This may for example allow to foster a slow and/or economical operation of the factory, i.e., by attributing the parameter k with high values to slow and/or economical tasks. The parameter k may be set by a user (e.g., for each task, the user may choose whether the propensity must include this parameter k and may set the value of k).

In examples, for some manufacturing task or all the manufacturing tasks, [RP] may be given by the formula [RP]=[RP1][RP2][RP3] . . . [RPn], where n is the number of constraints to respect, and where each [RPi] is a term rewarding respect of one of the constraints. n may equal one or may be larger than one.

In examples, for some manufacturing task or all the manufacturing tasks, [RP], or one of the [RPi], may be given by the formula [RP]=MAX−$[S_{n+1}]$, where $[S_{n+1}]$ is a quantity of the state of the product after execution of the manufacturing task (i.e., $[S_{n+1}]$ is the number of copies of the state of the product after execution of the manufacturing task), and where MAX is the maximal allowed number of copies of the product in the state $S_{n+1}$. This formula for [RP] allows to limit the number of outstanding copies of the product in the state $S_{n+1}$ during the execution of the manufacturing task. An alternative formula for [RP] for limiting the number of outstanding copies of the product in the state $S_{n+1}$ during the execution of the manufacturing task is the formula [RP]=$1/(c_1+c_2[S_{n+1}])$, where $c_1$ and $c_2$ are constants (e.g., defined by a user). Yet another alternative formula for [RP] for limiting the number of outstanding copies of the product in the state $S_{n+1}$ during the execution of the manufacturing task is the formula [RP]=$1/[S_{n+1}]$.

For example, in the case of the previously-discussed example of the brake assembly factory, the final assembling task may comprise such a constraint for limiting the number of outstanding copies of the final brake assembly during the execution of the assembling task. The propensity of the assembling task may thus comprise a term [RP] given by one of the three formulae previously-discussed.

In examples, for some manufacturing task or all the manufacturing tasks, [RP], or one of the [RPi], may be given by the formula, [RP 1=$e_{(\tilde{k},\lambda)}$, where $\tilde{k}$ is a constant (e.g., set by a user), and where λ is a criticality coefficient for an order of a quantity of the product, λ being the solution of the equation T=$\lambda T_0+(1-\lambda)T_1$, normalized on (0, 1], where T is the remaining time to finish the order, $T_0$ the reference time for finishing the order while allocating all the resources, machines and operators of the factory to the order, and $T_1$ the reference time for finishing the order while allocating to the order only a mean share of the resources, machines and operators of the factory. [$RP_{date}$] acts as a regulator (just as a regulating molecule) to switch between a fast production mode and an economical production mode. Thereby, all the manufacturing tasks related to a critical order have their propensities which rise, thereby prioritizing their execution over tasks allocated to non-urgent/non-critical orders. This will favor the respect of the due date for urgent orders. $T_0$ and $T_1$ may be computed beforehand, e.g., at an initial stage of the method or before the determining, by performing a calibration run of the method. k may be larger than 1, for example larger or equal to 10, and/or may be determined by machine-learning beforehand, e.g., at an initial stage of the method. An alternative formula for $[RP_{date}]$ is to be equal to A divided by the sum of all criticality coefficients for other tasks in case other tasks have a different criticality coefficient corresponding to other orders.

In examples, for some manufacturing task or all the manufacturing tasks, [RP], or one of the [RPi], may also be the solution of the differential equation $[RP]=k_1\{t \leq t_0\}-k_2[RP]\{t \geq t_0\}$, where $t_0$ is the last possible time of the day to launch the task, where t is the current time, and where $k_1$ and $k_2$ are constants (e.g., set by a user). $k_2$ may be larger than $k_1$, so that the task cannot be executed too long after the deadline $t_0$. The ratio between $k_2$ and $k_1$ may depend on the factory and its settings. These parameters may for example be set by a learning method adapted to the context of the factory and of the manufacturing application aimed for. For example, the more it is critical to start the task, the larger the ratio must be. In examples, the ratio is larger than 2. This allows to consider the operator's schedules, including considering their time-off (e.g., end of workday, week-end, or day off) for the tasks which are not to be interrupted. In this case $[O]=[O_p]$, the number of operators which are not only available at the current time t, but that will also be available at the end of the task. Upon occurrence of a manufacturing event such as the end of a work day, a week-end, or a day off, the concerned operators may be withdrawn from the determining S20, i.e., they are no more used in next i teration(s) (e.g., because their time slots do not comprise the time of beginning of the iteration(s)), and put back in at their return time, i.e., used in next iteration(s) (e.g., because their time slots comprise the time of beginning of the iteration(s)).

Referring back to FIG. 1, the computing S200 of the propensities results in a set (e.g., a list) of propensities each of a respective task. The iteration S250 of the determining S20 then ranks S210 the one or more manufacturing tasks according to a descending order of their respective propensities. In other words, the ranking S210 establishes an order within the manufacturing tasks by attributing ranks to them, so that the manufacturing task having the largest propensity tends to have (e.g., has) the first rank, the manufacturing task having the second largest propensity tends to have (e.g., has) the second rank, and so on, the manufacturing task having the smallest propensity tending to have (e.g., having) the last rank. The rank represents a time at which the manufacturing task will start: first ranks represent tasks which will start quickly, following ranks represent tasks which start later.

The ranking S210 may comprise attributing to each manufacturing task a rank given by an exponential law of parameter equal to the propensity. In other words, the rank of a task may be given by an exponential law having the task propensity as parameter. Thereby, tasks with large propensities have the first ranks while tasks with small propensities have the lasts ranks. The ranking S210 may comprise computing each rank and then attributing them.

For example, in the previously-discussed example of the brake assembly factory, as long as no molding task has been carried out, the final assembling task, which needs the molded rubber parts and the molded calipers, drilled rotors, and pads, cannot begin, thus will have a small propensity (e.g., equal to zero). Therefore, this task will be ranked last. To the contrary, the molding tasks will have large propensities, and thus first ranks, as they must begin in priority. At a next iteration, once there will be enough molded rotors, then the drilling task may have the largest propensity, and thus the first rank, as the priority is now to drill the molded rotors. At a next iteration, once there will be enough drilled rotors, molded rubber parts, and molded calipers and pads, the assembling task may then have the largest propensity, and thus the first rank, as the priority is now to assemble the parts into brake assemblies.

The exponential law may further depend on a randomly generated number, e.g., that may be the same for each task or that may vary for the different tasks. This allows to capture the fact that the operation of the factory is not necessarily deterministic, and that statistical variations may occur within the factory. Thereby the exponential law is not necessarily entirely dependent on the propensity: random statistical variations exist, and the randomly generated number represents them. The ranking S210 may comprise generating the number, e.g., by generating (e.g., according to a uniform random law) the same random number for all the tasks or by generating (e.g., according to a uniform random law) a respective random number for each task, and then computing the exponential law for each task, thereby computing the respective ranks of each task. For each manufacturing task, the rank of the task may be given by the formula (exponential law):

$$\tau = -\frac{\log(u)}{P},$$

where $\tau$ is a time, u is the randomly generated number, and P the propensity of the task. The ranking comprises associating, for each manufacturing task, to each time $\tau$, the rank of the task, where the smallest time $\tau$ is associated to the first rank, the second smallest time $\tau$ is associated to the second rank, and so on, until the largest time $\tau$ is associated with the last rank.

Referring back to FIG. 1, the iteration S250 of the determining S20 then comprises visiting S220 the one or more manufacturing tasks according to the ranking. In other words, the task having the first (i.e., lowest) rank is visited first, then the task having the second rank is visited, and so on, until all the tasks are visited. For each visited task, the iteration S250 then affects to the task one or more manageable machines and resources for executing the task, and optionally one or more operators in case the task needs operators to be executed. In other words, the iteration S250 provides to the ranked tasks, in the ascending order of their ranks, the inputs of the evolution law (e.g., the chemical reaction) representing the task.

Still referring to FIG. 1, the iteration S250 of the determining S20 then executes S230 the one or more tasks. Each task has its respective rank which represents a time of start of the task. In other words, the execution S230 follows a timeline, which may be implemented as a time loop, and at each time that corresponds to a start time of the task, the execution S230 executes the task. The timeline may be included in a time calendar followed by the determining S20 as previously discussed, e.g., the timeline of the execution S230 is, for each iteration, a portion of the time calendar of the determining S20. By "executes the task", it is meant that the execution runs the evolution law of the task, thereby transforming the input (i.e., machines, resources, operators, and current state of the product, as previously discussed) of the evolution law into its output (i.e., machines, operators, and next state of the product, as previously discussed).

Several tasks may be executed together (e.g., as groups or batches, for example to product 100 objects at a time) while the execution S230 follows the timeline, and tasks may start and other tasks may end while the execution S230 follows the timeline. During execution of a task, the machine(s) resources or operator(s) involve in the task are not available for other tasks. The execution S230 follows the timeline (e.g., the time loop is executed) until the occurrence, which is associated with a point in the timeline (e.g., a stopping condition of the time loop), of one or more of the manufacturing events. At this point, the execution S230 stops following the timeline (e.g., exists the time loop) and the determining S20 will go to a next iteration S250. Thereby, the execution S230 does not necessarily executes all the manufacturing tasks. The execution S230 may for example execute only a part of all the manufacturing tasks, e.g., and then be interrupted by the occurrence of an unexpected event. Alternatively, the execution S230 may execute all the manufacturing tasks.

For example, in the case of the previously-discussed brake assembly factory, all the molding tasks may be executed together, as notably discussed earlier with reference to FIG. 3, i.e., in a same run of the execution S230. The production of a sufficient amount of molded rubber parts, rotors, calipers and/or pads may form an event occurrence that stops the execution S230. A fire caused by one of the molding machines, which causes a safety problem, may also be one of such events.

Still referring to FIG. 1, prior to going to a next iteration S250, the iteration S250 of the determining S20 may comprise updating S240 data about the product to manufacture. Updating data about the product to manufacture may comprise updating each state of the product. Specifically, prior to the execution S230 of the manufacturing task, the product is, for each manufacturing task, in a current state relative to the manufacturing task. For example, the current state may consist in one or more (e.g., unfinished) components of the product or the product itself but unfinished. The execution S230 then causes manufacturing tasks to transform the current state of the product into a next state of the product. For example, components of the product may be assembled and/or transformed (e.g., finished), thereby constituting the next state, or the product itself may be finished, thereby constituting the next state of the product, which is the current state of the next iteration (if any). The updating S240 may thus comprise, in the data associated with the next iteration S250 (if any), changing current states of the product into their next states, where appropriate.

For example, in the case of the previously-discussed brake assembly factory, where the event occurrence stopping the execution S230 is the production of a sufficient amount of molded rubber parts, rotors, calipers and/or pads, the updating S240 comprises updating the number of molded rubber parts, rotors, calipers and/or pads.

The updating S240 may also comprise, besides the update of the data about the product to manufacture, updating the data associated to the next iteration. The updating may for example comprise:

updating the time of beginning of the iteration, e.g., by making this time equal to the time of the end of the execution S230;

updating the manageable machines available at the time of beginning of the next iteration, for example if the occurrence of the manufacturing event(s) has caused one or more machines to be unavailable. For example, in the case of the previously-discussed brake assembly factory, if the event occurrence is a machine causing a fire, the update comprises updating the machines available by discarding (e.g., marking unavailable) the machines made unavailable by the fire;

updating the operators available at the time of beginning of the iteration, for example if the occurrence of the manufacturing event(s) has caused one or more operators to be unavailable; and/or updating the resources available at the time of beginning of the iteration, for example by taking into account the resources consumed by the execution S230 and/or resources consumed or wasted because of the occurrence of the manufacturing event(s) and/or an increase of resources because of the occurrence of the manufacturing event(s) (e.g., because of a delivery).

The iterations S250 may stop once there is no more occurrence of a manufacturing event in the time calendar of the determining.

The method S20 may be executed once, or, alternatively, may be executed several times, each time comprising its one or more iterations S250. Each execution of the method may correspond to the manufacturing of a single product, e.g., obeying its own production order. Thereby each execution corresponds to the production of a given same product, for example in several copies, the several executions corresponding for example to the successive production of different products. Alternatively, the method may be run once but nevertheless corresponds to the production of several different products, for example each in several copies. In this case, the "product to manufacture" in the method refers to the several products. In other words, one execution (also referred to as "run") of the method may correspond to the fabrication of one or more copies of a same product or to the fabrication of several different products, each in one or more copies. In any case, an execution of the method corresponds to a time frame in which a certain number of order is to be satisfied, which generally leads to several products or several copies of a same product being manufactured.

It is further provided a factory comprising at least one manageable machine operable by an operating mode of the factory determined according to the method. Each machine of the at least one manageable machine may thus be operated from distance by a computer system of the factory executing the operating mode, or alternatively, by workers and employees executing the operating mode (e.g., by following instructions therein, assignments therein, and a schedule therein). The factory may be an automated factory such as a chain of production.

The method is computer-implemented. This means that steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined.

A typical example of computer-implementation of a method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g., one for the program, and possibly one for the database).

Figure 5:
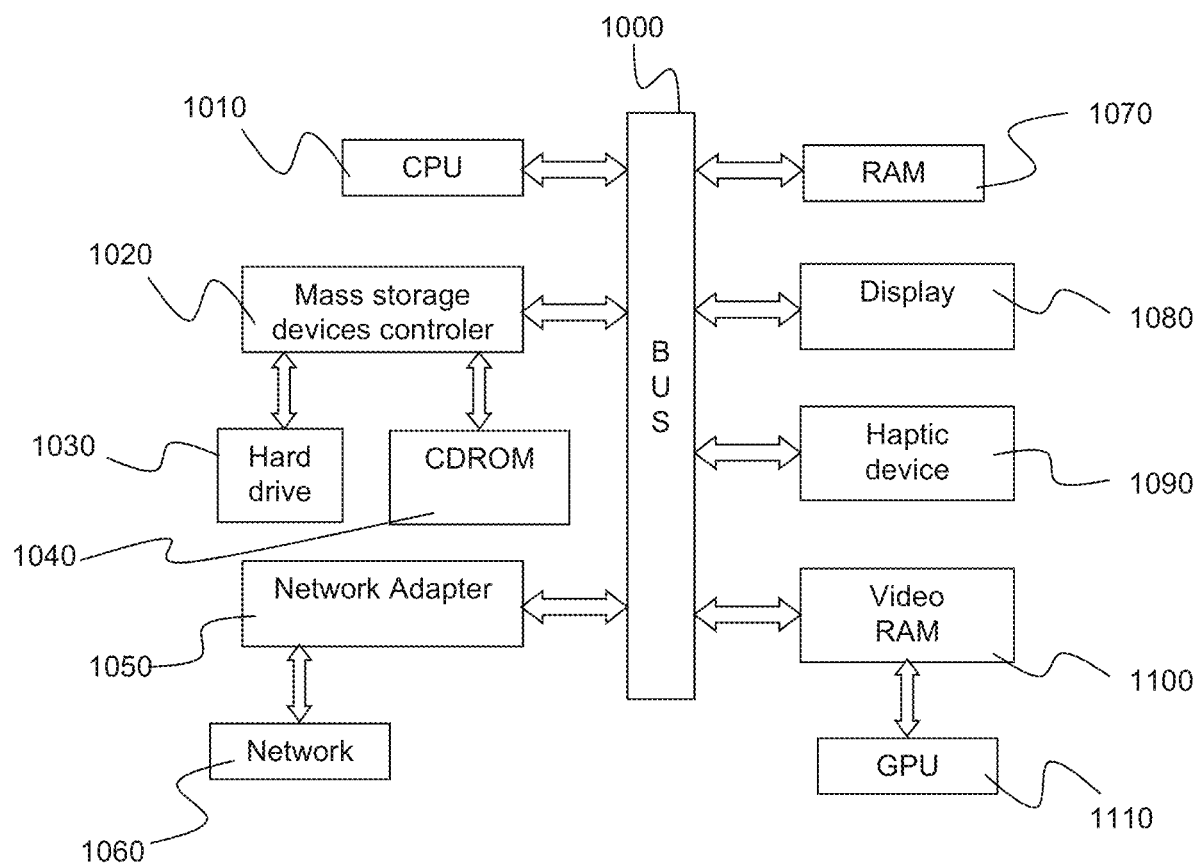
FIG. 5 shows an example of the system.

FIG. 5 shows an example of the system, wherein the system is a client computer system, e.g., a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

The invention claimed is:

1. A computer-implemented method for operating a factory, the method comprising:
obtaining one or more manufacturing tasks, each manufacturing task being represented by an evolution law which describes a manufacturing of a product by one or more manageable machines using resources;
obtaining one or more manufacturing constraints;
obtaining one or more manufacturing events;
determining an operating mode of the factory based on the one or more manufacturing constraints and on one or more constraints on a product to manufacture, the determining including one or more iterations of:
computing, for each manufacturing task, a respective propensity of a manufacturing task, the propensity representing a frequency with which the task is chosen for manufacturing the product given the constraints and a previous occurrence of one or more of the manufacturing events,
ranking the one or more manufacturing tasks according to a descending order of their respective propensities,
visiting the one or more manufacturing tasks according to the ranking and, for each visited task, affecting, to the task, one or more manageable machines and resources for executing the task, and
executing the one or more manufacturing tasks until an occurrence of one or more of the manufacturing events.

2. The method of claim 1, wherein, for each manufacturing task, the propensity is an increasing function of each of:
a number of the one or more manageable machines,
a quantity of a state of the product before the manufacturing, and
an indicator that a quantity of the resources is above a threshold of resources required for executing the manufacturing.

3. The method of claim 2, wherein, for the one or more manufacturing tasks, the function is also an increasing function of a number of operators of the one or more manageable machines.

4. The method of claim 2, wherein, for the one or more manufacturing tasks, the function is also an increasing function of a term rewarding respect of at least one of the constraints.

5. The method of claim 2, wherein, for the one or more manufacturing tasks, the function is also an increasing function of a parameter.

6. The method of claim 2, wherein the function is a product of variables of the function.

7. The method of claim 1, wherein the ranking includes attributing, to each manufacturing task, a rank given by an exponential law of parameter equal to the propensity.

8. The method of claim 7, wherein the exponential law further depends on a randomly generated number.

9. The method of claim 1, wherein the determining further comprises, at each iteration, after the executing:
updating data about the product to manufacture.

10. The method of claim 1, wherein the obtaining further includes, for each manufacturing task, defining the evolution law by representing the manufacturing task by a chemical reaction, wherein the chemical reaction is of the type:

$$M+R+S => IS$$

$$IS => M+S_{n+1},$$

where M represents the one or more manageable machines, R represents the resources, $S_n$ represents a state of the product before execution of the manufacturing task, IS represents the product while being transformed by the manufacturing task, and $S_{n+1}$ represents a state of the product after execution of the manufacturing task, and wherein the respective propensity of the manufacturing task is given by formula:

$P=[M][S_n]\{[R]\geq c\}[RP]$, where P is the propensity, [M] is a number of the one or more manageable machines, $[S_n]$ is a quantity of the state product before the manufacturing, $\{[R]\geq c\}$ is an indicator that a quantity of the resources is above a threshold of resources required for executing the manufacturing, c being the threshold, and [RP] is a term rewarding respect of at least one of the constraints.

11. The method of claim 1, wherein the method further comprises, based on the determined operating mode, assigning manageable machines and resources to respective manufacturing tasks, and after the assigning, operating the factory.

12. A device comprising:
processor; and
a non-transitory computer-readable data storage medium having recorded thereon a computer program comprising instructions for operating a factory that when executed by the processor causes the processor to configured to:
obtain one or more manufacturing tasks, each manufacturing task being represented by an evolution law which describes a manufacturing of a product by one or more manageable machines using resources,
obtain one or more manufacturing constraints,
obtain one or more manufacturing events, and
determine an operating mode of the factory based on the one or more manufacturing constraints and on one or more constraints on a product to manufacture, the processor being configured to determine the operating mode by one or more iterations of being configured to:
compute, for each manufacturing task, a respective propensity of the manufacturing task, the propensity representing a frequency with which the task is chosen for manufacturing the product given the constraints and a previous occurrence of one or more of the manufacturing events,
rank the one or more manufacturing tasks according to a descending order of their respective propensities,
visit the one or more manufacturing tasks according to the ranking and, for each visited task, affecting, to the task, one or more manageable machines and resources for executing the task, and
execute the one or more tasks until an occurrence of one or more of the manufacturing events.

13. The device of claim 12, wherein, for each manufacturing task, the propensity is an increasing function of each of:
a number of the one or more manageable machines,
a quantity of a state of the product before the manufacturing, and
an indicator that a quantity of the resources is above a threshold of resources required for executing the manufacturing.

14. The device of claim 13, wherein, for one or more manufacturing tasks, the function is also an increasing function of a number of operators of the one or more manageable machines.

15. The device of claim 14, further comprising a processor coupled to the computer-readable data storage medium.

16. The device of claim 13, further comprising a processor coupled to the computer-readable data storage medium.

17. A non-transitory computer readable medium having stored thereon a program that when executed by a computer causes the computer to implement the method for operating the factory according to claim 1.

18. A factory comprising:
at least one manageable machine operable by an operating mode of the factory determined according to a program for operating a factory that when executed by a processor causes the processor to be configured to:
obtain one or more manufacturing tasks, each manufacturing task being represented by an evolution law which describes a manufacturing of a product by one or more manageable machines using resources,
obtain one or more manufacturing constraints,
obtain one or more manufacturing events,
determine an operating mode of the factory based on the one or more manufacturing constraints and on one or more constraints on a product to manufacture, the processor being configured to determine the operating mode by one or more iterations of being configured to:
compute, for each manufacturing task, a respective propensity of the manufacturing task, the propensity representing a frequency with which the task is chosen for manufacturing the product given the constraints and a previous occurrence of one or more of the manufacturing events,
rank the one or more manufacturing tasks according to a descending order of their respective propensities,
visit the one or more manufacturing tasks according to the ranking and, for each visited task, affecting, to the task, one or more manageable machines and resources for executing the task, and
execute the one or more tasks until an occurrence of one or more of the manufacturing events.

19. The factory of claim 18, wherein, for each manufacturing task, the propensity is an increasing function of each of:
a number of the one or more manageable machines,
a quantity of a state of the product before the manufacturing, and
an indicator that a quantity of the resources is above a threshold of resources required for executing the manufacturing.

20. The factory of claim 19, wherein, for one or more manufacturing tasks, the function is also an increasing function of a number of operators of the one or more manageable machines.

* * * * *